United States Patent [19]
Takeuchi

[11] Patent Number: 5,510,715
[45] Date of Patent: Apr. 23, 1996

[54] APPARATUS FOR DETERMINING THE IGNITION CHARACTERISTIC OF AN INTERNAL COMBUSTION ENGINE

[75] Inventor: Manabu Takeuchi, Osaka, Japan

[73] Assignee: Diamond Electric Mfg. Co., Ltd., Osaka, Japan

[21] Appl. No.: 12,389

[22] Filed: Feb. 2, 1993

[51] Int. Cl.⁶ .............................. F02P 17/00; F02P 9/00; G01M 15/00
[52] U.S. Cl. .................... 324/391; 324/393; 324/399; 73/117.3
[58] Field of Search .................................. 324/378, 384, 324/385, 388, 390–393, 399, 402; 123/169 EL, 169 G, 169 R, 620, 406, 425; 73/116, 117.3, 118.1, 35

[56] References Cited

U.S. PATENT DOCUMENTS

| | | | |
|---|---|---|---|
| 4,515,132 | 5/1985 | Anderson et al. | 123/494 |
| 4,987,771 | 1/1991 | Iwata | 73/117.3 |
| 5,146,893 | 9/1992 | Ohsawa . | |
| 5,180,983 | 1/1993 | Murata et al. | 324/399 |
| 5,222,393 | 6/1993 | Ohsawa | 73/117.3 |
| 5,271,268 | 12/1993 | Ikeuchi et al. | 324/393 X |
| 5,293,129 | 3/1994 | Ikeuchi et al. | 324/399 |

Primary Examiner—Sandra L. O'Shea
Assistant Examiner—Jay M. Patidar
Attorney, Agent, or Firm—Longacre & White

[57] ABSTRACT

An apparatus for determining the ignition characteristic of combustion in an internal combustion engine having an ignition coil including an ionic current computing circuit which analyzes ionic current enabled as a result of combustion. Ionic current flow is facilitated by establishing a voltage potential across the gap of a spark plug the instant after an ignition spark across the gap has occurred. The flow of ionic current enabled by the combustion process is provided to an ionic current computing circuit effecting the creation of a signal reflecting the flow of ionic current. The output signal from the computing circuit is integrated to determine the quality (length and magnitude of ionic current flow. This quality of flow is compared against predetermined high and low values for the integrated value and the ignition characteristic or state of combustion, ie, whether a spark and/or complete combustion has occurred, of the cylinder can be understood.

4 Claims, 3 Drawing Sheets

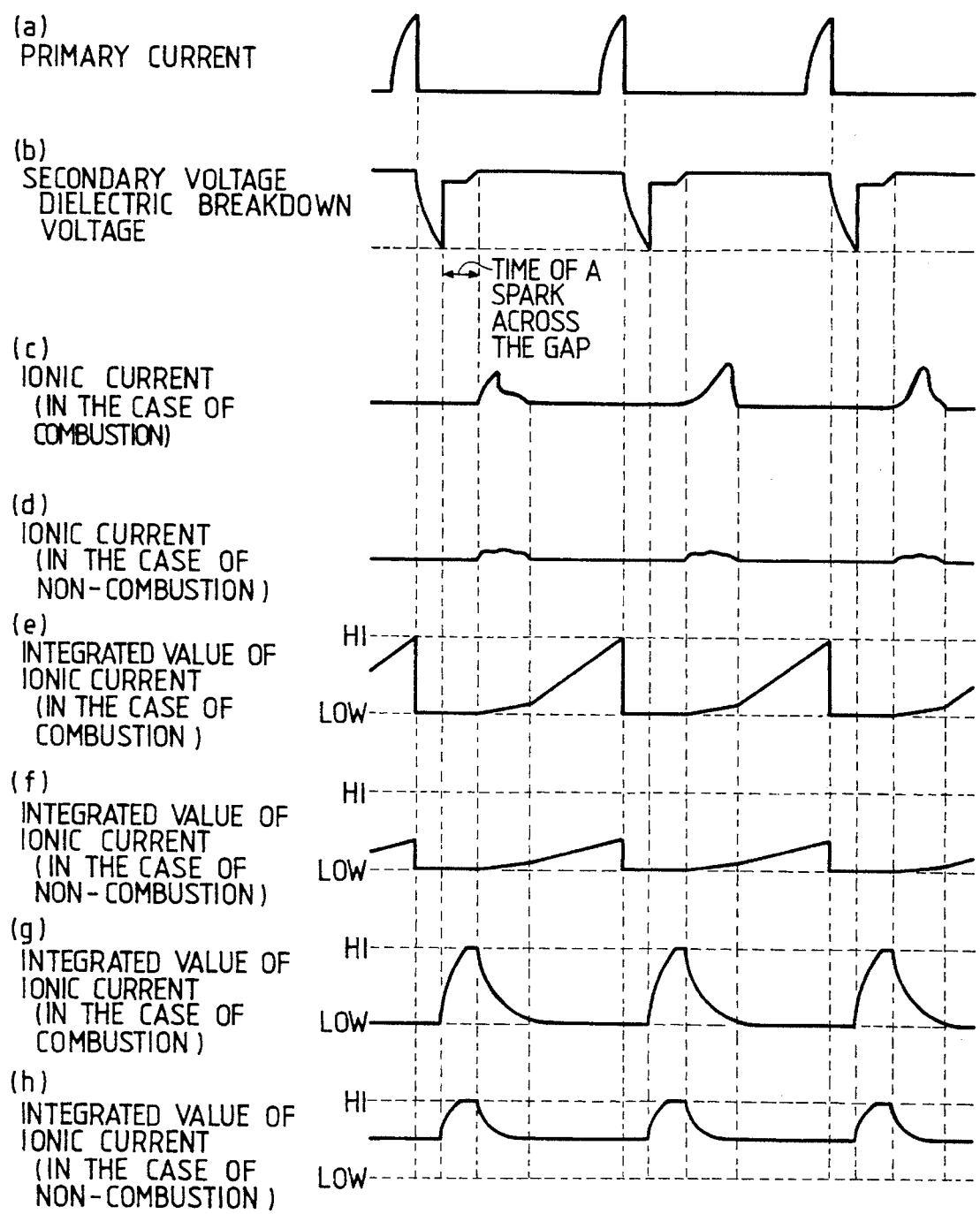

5,510,715

APPARATUS FOR DETERMINING THE IGNITION CHARACTERISTIC OF AN INTERNAL COMBUSTION ENGINE

BACKGROUND OF THE INVENTION a) Field of the Invention

The present invention pertains to an apparatus for determining the state of combustion within internal combustion engines which use an ignition coil as part of its ignition system.

b) Description of Related Art

A known ignition system for internal combustion engines is shown in FIG. 5. The system includes an ignition coil 10 having a primary winding 12 and a secondary winding 14. On the primary side of the ignition coil 10, a power supply unit 2 is connected to a first end of the primary winding 12 and an ignition timing control means 4 is connected to a second end of the primary winding 12, thereby forming the primary circuit. A known ignition timing control means 4 includes a transistor with the collector connected to the second end of the primary winding 12, the emitter connected to ground, and the base connected to an ignition signal input port 6. On the secondary side of the ignition coil 10, spark plug gaps 20,22 are provided between the secondary winding 14 and ground.

The known ignition system operates when the primary side of the ignition coil 10 is "opened", i.e. when current does not flow from the emitter to the collector. When the ignition signal input port 6 receives an ignition signal, the flow of current from the emitter to the collector occurs, thus the "primary" current flow through the primary winding 12.

As is well understood, the interruption of primary current flow through the primary winding 12 induces a secondary voltage in the secondary winding 14. Ignition is possible when the secondary voltage exceeds the breakdown voltage across the gaps 20,22, and a sufficient spark is created to ignite a mixture of fuel and air under compression. Such a spark is created at the instant the primary current flow ceases after reaching a predetermined level. FIGS. 6(a) and 6(b) show primary current flow and secondary voltage, respectively. The vertical dashed lines extending between the designated portions of FIG. 6 identify common points in time to compare and relate the different parameters.

The known ignition system, designed only to provide ignition to an internal combustion engine, is not capable of analyzing performance. For example, it is desirable to determine the state of combustion, e.g. whether combustion has or has not occurred. However, the known ignition system is not capable of determining whether an ignition signal at the input port 6 has in fact created a spark across the gaps 20,22, or whether the fuel and air mixture has actually been ignited by a spark.

SUMMARY OF THE INVENTION

An object of the present invention is to provide an apparatus for analyzing the state of combustion in an internal combustion engine. The present invention meets this and other objectives by:

1) an ionic current computing circuit, connected via a current limiting diode and a combustion state detector to an intermediate point along the secondary winding of an ignition coil;

2) a primary flyback voltage comparator circuit, monitoring "flyback" voltage that is developed in the primary winding at the instant the primary current is cut off;

3) a reset signal provided at a reset signal output port for the duration a spark is created across the gaps; and 4) comparing the output of the ionic current computing circuit to a reference voltage obtained through a reference voltage stabilizing circuit.

In this disclosure, ionic current refers to current flow in the secondary winding occurring as a consequence of ionization caused by combustion, when there is a voltage potential across the spark plug gaps. The ionic current computing circuit integrates the ionic current flow over time, whereupon it is possible to determine not only whether a spark was created across the gaps at the precise instant a firing signal was supplied to the firing signal input port, but also whether the fuel was actually ignited by the spark.

BRIEF DESCRIPTION OF THE DRAWINGS

FIG. 6 shows the relationship over time between primary current (a), secondary voltage with respect to breakdown voltage (b), ionic current with the occurrence of combustion (c), ionic current without the occurrence of combustion (d), the integrated value of ionic current with the occurrence of combustion (e), the integrated value of ionic current without the occurrence of combustion (f), the integrated value of ionic current with the occurrence of combustion (g), and the integrated value of ionic current without the occurrence of combustion (h), for the apparatus of FIG. 1.

DESCRIPTION OF THE PREFERRED EMBODIMENT

Figure 1:
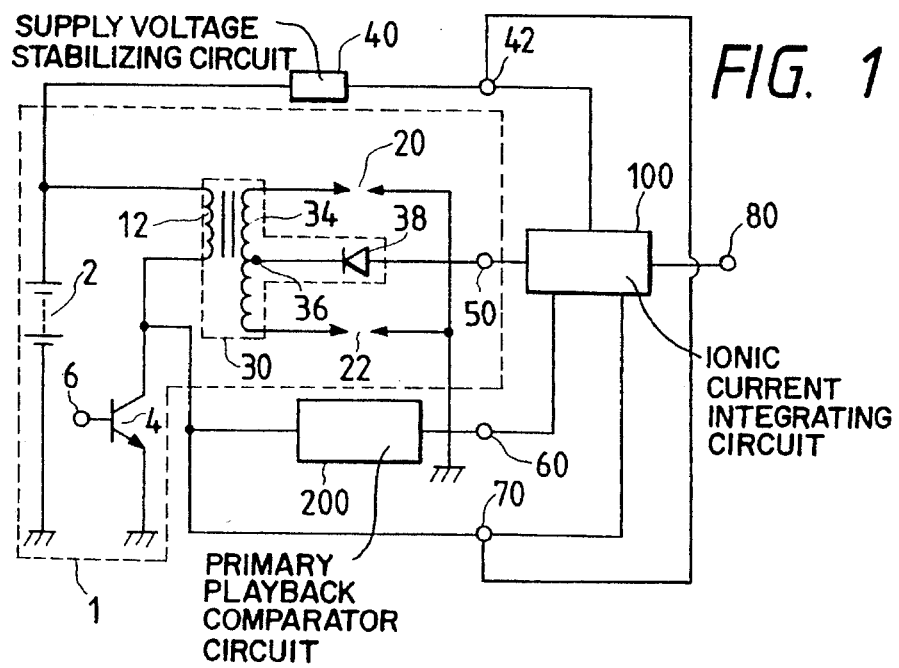
FIG. 1 schematically shows an apparatus for detecting the state of combustion in an internal combustion engine according to an embodiment of the present invention.

Identical or similar elements of the present invention are consistently identified in the drawings and throughout the following description with the same reference number. Those elements which are identical or similar to those described in association with the known ignition system are identified by like reference numbers and are not further discussed in detail.

FIG. 1 shows an apparatus 1 for creating a spark across spark plug gaps 20,22. The spark plug gaps 20,22 are provided at opposite ends of a secondary winding 34 of an ignition coil 30. Connected at an intermediate point 36, shown here as a midpoint, of the secondary winding 34 is the cathode of a current limiting diode 38. The anode of the current limiting diode 38 is connected to a terminal 50. A supply voltage stabilizing circuit 40 maintains voltage of a motor vehicle battery to be constant within a range of 5 V and 9 V.

Figure 2:
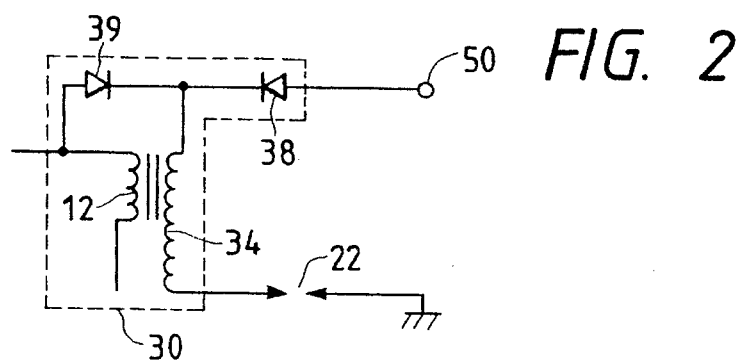
FIG. 2 shows an alternate circuit diagram for the apparatus of FIG. 1 where only one spark plug gap is provided.

Whereas FIG. 1 shows two spark plug gaps 20,22, FIG. 2 shows an alternative circuit diagram with only one spark plug gap 22. The cathode of the current limiting diode 38 is now connected to the end of the secondary winding 34 opposite the spark plug gap 22, while the anode remains connected to the terminal 50. The cathode of a current leakage preventing diode 39 is also connected at the junction of the secondary winding 34 and the cathode of current limiting diode 38, and the anode of the current leakage preventing diode 39 is connected to one end of the primary winding 12.

Element 38 is shown as a diode in both FIG. 1 and FIG. 2, however, a resistor may be substituted in so far as the function of element 38 is to limit current.

FIG. 1 further shows an ionic current integrating circuit 100 connected to:

1) the terminal 50,
2) an output port 80 for providing an indication of the state of combustion,
3) a power supply 2 via a series-connected reference voltage input port 42 and supply voltage stabilizing circuit 40,
4) a collector of the ignition timing control drive transistor 4 via a series-connected reset signal output port 60 and a primary flyback voltage comparator circuit 200, and
5) the same collector of the ignition timing control device 4 via a primary flyback voltage input port 70.

Figure 3:
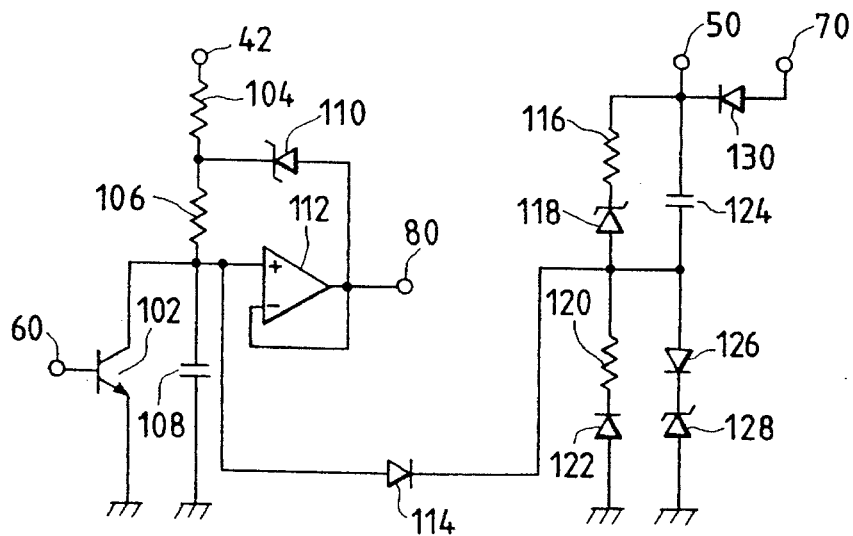
FIG. 3 shows a circuit diagram of a first embodiment for an ionic current computing circuit in the apparatus of FIG. 1.

FIG. 3 shows the ionic current integrating circuit 100 in detail. The ionic current integrating circuit 100 includes a series-connected capacitor 124, diode 126 and zener diode 128 provided between the terminal 50 and the ground. In particular, the anode of the diode 126 is connected to the capacitor 124, the cathode of the diode 126 is connected to the cathode of the zener diode 128, and the anode of the zener diode 128 is grounded.

FIG. 3 further shows the primary flyback voltage input port 70 is connected to the anode of a diode 130, with the cathode of the diode 130 connected to the junction between the terminal 50 and the capacitor 124. The junction between the terminal 50 and the capacitor 124 is also connected to ground via a series-connected resistor 116, zener diode 118, resistor 120 and diode 122. In particular, the cathode of the zener diode 118 is connected to the resistor 116, the anode of the zener diode 118 is connected to one end of the resistor 120, the cathode of the diode 122 is connected to the other end of the resistor 120, and the anode of the diode 122 is grounded.

The junction between the capacitor 124 and the diode 126 is connected to the junction between the zener diode 118 and the resistor 120, as well as to the cathode of a diode 114. The anode of diode 114 is connected to the non-inverting input port (+) of an operational amplifier 112. The output port of the operational amplifier 112 is connected to the output port 80 for providing an indication of the state of combustion. The connection to the inverting input port (−) of the operational amplifier 112 will be described below.

Figure 7:
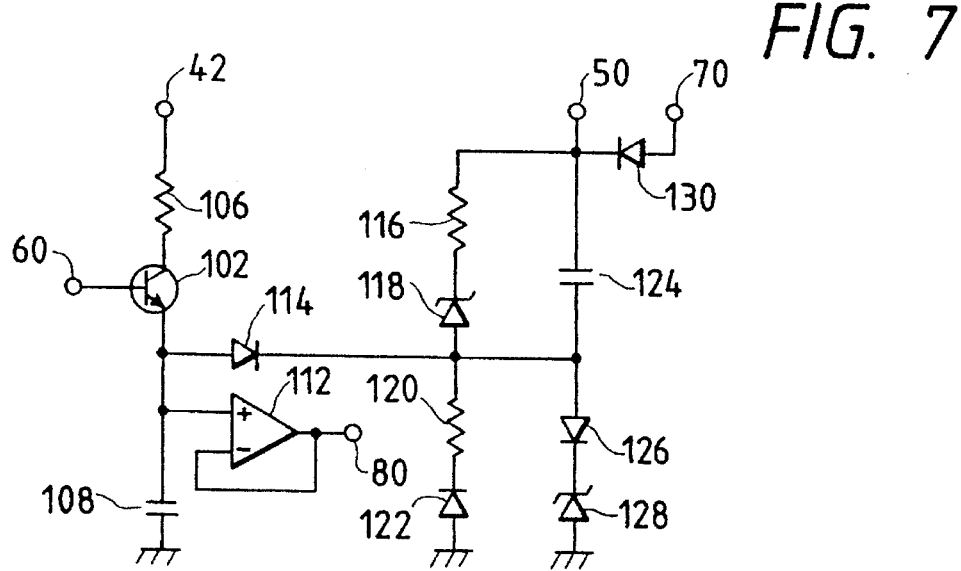
FIG. 7 shows a circuit diagram of a second embodiment for an ionic current computing circuit in the apparatus of FIG. 1.

Connected in series between the reference voltage input port 42 and ground are resistors 104 and 106, as well as a capacitor 108. The junction between the resistors 104 and 106 is connected to the cathode of a zener diode 110, with the anode of the zener diode 110 connected to the inverting input port (−) of the operational amplifier 112. The junction between the output port of the operational amplifier 112 and the output port 80 also serves as the junction between the zener diode 110 and the inverting input port (−) of the operational amplifier 112. The non-inverting input port (+) of the operational amplifier 112 is also connected to the junction between the resistor 106 and the capacitor 108, as well as to the collector of a transistor 102. The emitter of the transistor 102 is grounded while the base is connected to the reset signal output port 60. The circuit diagram such as shown in FIG. 7 may be used as a second embodiment of the ionic current computing circuit 100. In the circuit diagram shown in FIG. 7, the base of the transistor 102 is connected to the reset signal output port 60, the collector of the transistor 102 is connected to the reference voltage input port 42 via the resistor 106, and the emitter of the transistor 102 is grounded via the capacitor 108. The anode of the diode 114 and the non-inverting input port (+) of the operational amplifier 112 are connected between the emitter and capacitor 108. The inverting input port (−) of the operational amplifier 112 is connected to the output port of the operational amplifier 112, and the output port connected to the output port 80. The description regarding the members from the right side of the cathode of the diode 114 shown in FIG. 7 is omitted since it is the same as FIG. 3.

Figure 4:
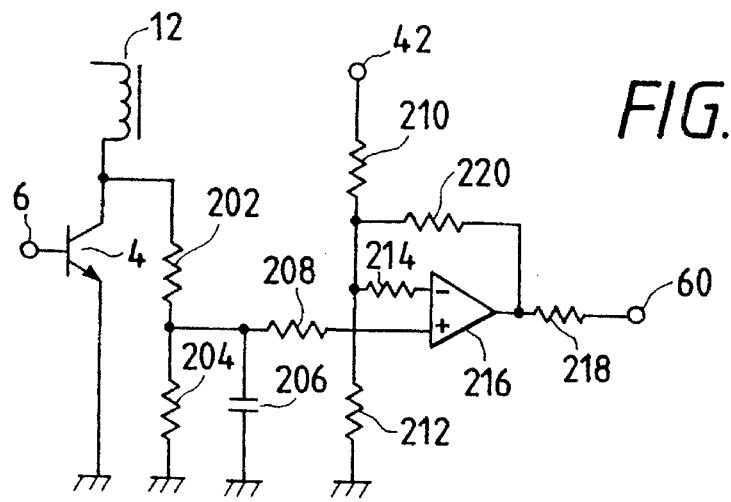
FIG. 4 shows a circuit diagram of an embodiment for a primary flyback voltage comparator circuit in the apparatus of FIG. 1.
Figure 5:
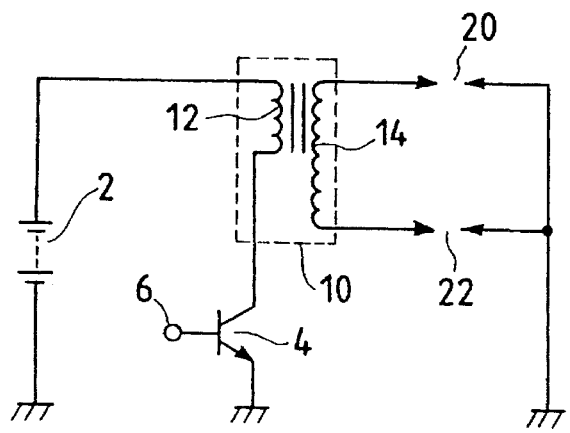
FIG. 5 shows a circuit diagram of a known system for providing ignition to an internal combustion engine.

FIG. 4 shows the primary flyback voltage comparator circuit 200 in detail. Series-connected resistors 210 and 212 are provided between reference voltage input port 42 and ground. The junction between the two resistors 210 and 212 is also connected via a resistor 214 to the inverting input port (−) of an operational amplifier 216, as well as to the output port of the operational amplifier 216 via a resistor 220. In turn, the junction between the output port of the operational amplifier 216 and the resistor 220 is connected to the reset signal output port 60 via a resistor 218.

FIG. 4 further shows the junction between the primary winding 12 and the ignition timing control means 4 is series-connected to the non-inverting input port (+) of the operational amplifier 216 via resistors 202 and 208. The junction between the resistors 202 and 208 is parallel-connected to ground via a resistor 204 and a capacitor 206.

The following description of the operation of the apparatus according to the present invention, with reference to the exemplary construction described above, does not discuss in detail those actions or operations that are identical or similar to those which are described in association with the known ignition system.

With regard to spark creating apparatus 1, when voltage supplied from the power supply 2 to the primary winding 12 is periodically interrupted, a corresponding high voltage is developed in the secondary winding 34 of the ignition coil 30. Immediately after a spark is created across the gaps 20,22, a predetermined voltage provided at the terminal 50 is passed through the current limiting diode 38 and a portion of the secondary winding 34, thereby producing a positive (+) voltage potential at the electrode on the coil side of each of the gaps 20,22.

It is well know that fuel is ionized during combustion, consequently, ionic current, which can be related to the state of combustion, flows across the plug gaps in the presence of the aforementioned voltage potential. Specifically, the state of combustion may be determined by monitoring the ionic current flowing from the terminal 50, through the current limiting diode 38, the secondary winding 34, a first one of the two electrodes at each of the spark plug gaps 20,22, the ionized fuel, and the second one of the two electrodes at each of the spark plug gaps 20,22, to ground. Plots against time for several parameters relevant to the present invention are shown in FIG. 6.

FIGS. 6(a) and 6(b) relate the primary current to the secondary voltage. The current flowing through the primary winding 12 reaches a predetermined level before being cut off by the ignition timing control means 4o The instant this occurs, voltage begins developing in the secondary winding 34 until it reaches the dielectric breakdown voltage, indicated as a horizontal dashed line in FIG. 6(b), thereupon creating a spark across the spark plug gaps 20,22. The terminal 50 facilitates the voltage potential at the conclusion of the spark's duration, and the ionic current flow is analyzed to determine the state of combustion based on the degree of fuel ionization.

In practice, ionic current flow is neither consistent or regular, as shown in FIGS. 6(c) and 6(d). To correctly evaluate the state of combustion, it is not sufficient to simply determine the existence of ionic current flow. The magnitude of the measured ionic current may likely to fall within anticipated upper and lower limits for ionic current, whether combustion has occurred or not.

The operation of the primary flyback voltage comparator circuit 200 and the ionic current computing circuit 100 will now be described in detail.

A primary flyback voltage comparator circuit, such as that shown in FIG. 4, uses resistors 202 and 204 to divide the flyback voltage developed (ie, when a spark at the spark plug has occurred) in the primary winding 12 at the instant the primary current is cut off. The divided voltage is input to a hysteresis comparator, such as the operational amplifier 216 supported by the peripheral circuit described above, and compared with a threshold value obtained from the reference voltage input port 42. If the divided voltage is greater than the threshold value, a reset signal is provided at the reset signal output port 60 to the ionic current computing circuit 100. The effect of the reset signal is to initialize (ground and thereby zero out) the integral value in the ionic current computing circuit 100.

In FIG. 3, when the transistor 102 is in the OFF state the charging of capacitor 108 is accomplished through stable reference voltage input port 42. When the transistor 102 is in the ON state, the capacitor 108 charging from voltage source 42 is interrupted and capacitor 108 is discharged to ground through transistor 102.

An ionic current computing circuit, such as that shown in FIG. 3, uses capacitor 108 to store electric energy supplied from the reference voltage input port 42 through resistors 104 and 106. The electrical energy stored in the capacitor is then supplied to the non-inverting input port (+) of the operational amplifier 112. The operational amplifier 112 functions as a voltage follower with a direct feedback connection from the output port to the inverting input port (−), therefore the charge voltage of capacitor 108 and the output voltage of the operational amplifier 112 eventually equalize.

The ionic current computing circuit 100 shown in FIG. 3 further shows zener diode 110 connected between the output port of operation amplifier 112 and the junction of the resistors 104 and 106. The connection of zener diode 110 ensures the voltage across the resistor 106 remains constant. Consequently, the current flowing through the resistor 106, which is equivalent to the charging current of the capacitor 108, also remains constant. Absent leakage of any current from the power supply for the operational amplifier 112 and the transistor 102, and without any current flow through the diode 114, it is possible to insure that the charge voltage of capacitor 108 increases substantially linearly. In other words, the charge voltage of capacitor 108 and the output of operational amplifier 112 will produce ramp waveforms similar to those illustrated in FIGS. 6(e) and 6(f).

In FIG. 7 showing a second embodiment of the ionic current computing circuit 100, similar to FIG. 3, the transistor 102 is in the ON state while a reset signal is output at port 60 (corresponding to the period of the gap discharging time shown in FIG. 6), and is in the OFF state except in the above-mentioned period.

When the transistor 102 is in the ON state, the input voltage from the reference voltage input port 42 is charged in the capacitor 108 via the resistor 106. The resistor 106 is adjusted to be low resistance value in such a manner that the capacitor 108 is at completely charged while the reset signal is output at port 60.

When the transistor 102 is in the OFF state, the input voltage from the input port 42 is not charged in the capacitor 108, so the capacitor 108, which was completely charged in the ON state, is discharged via the diode 114.

Therefore, when there is not an input voltage to the operational amplifier 112, current leakage from the transistor 102, nor current flown into the diode 114, the signal at the output port 80 shown in FIG. 7 will produce ramp waveforms substantially as illustrated in FIGS. 6(g) and 6(h).

The means for analyzing ionic current flow within the ionic current computing circuit 100 shown in FIG. 3 comprises capacitor 124 for storing electric energy supplied from the primary flyback voltage input port 70. Specifically, primary flyback voltage provided at the input port 70 passes through diode 130, capacitor 124, diode 126 and zener diode 128, back to ground. The zener voltage of the zener diode 128 is selected to be slightly higher than the reference voltage provided at the input port 42, thereby preventing the electric charge on the capacitor 108 from passing through diodes 114 and 126 to the ground. At the same time, the zener voltage of the zener diode 128 is selected to be lower than the primary flyback voltage provided at the input port 70, so as not to present a substantial obstacle to charging the capacitor 124.

Combustion is detected by ionic current flow through the terminal 50. According to Kirchhoff's Current Law, the magnitude of ionic current flow through the junction between capacitor 124 and diode 126 must be equal to the summation of the current components flowing into the junction between capacitor 124 and diode 126 from ground. That is to say, the summation of:

1) the ionic current flow through the capacitor 124;

2) the current flow from ground, through diode 122 and resistor 120; and 3) the current flow from ground, through capacitor 108 and diode 114, must be zero. In so far as the third of these components also has the effect of lowering the charge voltage of capacitor 108, adjustments to the third component as a result of ionic current flow (i.e. the first component) are reflected by a reduction in charge voltage of capacitor 108.

Selecting an appropriate value for the resistance for resistor 120 alters the ratio of the contribution by each of the second and third components to current flow through the junction between capacitor 124 and diode 126. This makes it possible to adjust the sensitivity of the third component to the effect of the ionic current. Therefore, according to the present invention, the magnitude of the ionic current will alter the charge voltage of capacitor 108. In case of using the ionic current computing circuit 100 shown in FIG. 3, if the ionic current is small, the output of operational amplifier 112 will increase appreciably to a higher voltage within the same unit time, whereas if the ionic current is great, the output of operational amplifier 112 is boosted only slightly within a unit time. In case of using the ionic current computing circuit 100 shown in FIG. 7, if the ionic current is small, the output of operational amplifier 112, as shown in FIG 6(h)

attenuated within a unit time less than when the ionic current is great and the output of the operational amplifier 112, is attenuated appreciably more, as shown in FIG. 6(g). The output of the operational amplifier 112 is supplied to the output port 80, and is compared (by a known, per se, I.C. engine ECU) with predetermined limit value(s) (upper, lower or both) so as to determine the state of combustion.

Rather than attempting to determine the state of combustion by measuring an instantaneous value of ionic current, the apparatus according to the present invention computes the quality of ionic current. The advantage being the positive determination of not only whether a spark is created across the gaps at the instant a firing signal is supplied to the firing signal input port, but also whether the fuel has actually been ignited.

What is claimed is:

1. An apparatus for determining the state of combustion in an internal combustion engine, said apparatus comprising:

an ignition coil having a primary winding and a secondary winding;

a power supply providing a primary current flow through said primary winding, and an ignition timing control means for interrupting said primary current flow upon receipt of a firing signal from a firing signal input port, connected to said primary winding;

two spark plug gaps in an engine combustion chamber connected to said secondary winding;

an ionic current sensing, and computing circuit connected to said secondary winding, through a current limiting element, for measuring the flow of ionic current in said combustion chamber when a voltage potential has been applied to said two spark plug gaps, wherein said ionic current computing circuit is connected at an intermediate point along said secondary winding;

a reference voltage input port connected to a reference voltage and an output port, said output port adapted to provide an indication of the state of the combustion and connected to said ionic current computing circuit; and circuit means for producing a signal indicating a voltage potential at said two spark plug gaps, said circuit means being connected to said ionic current computing circuit; wherein said ionic current computing circuit computes a measured value of said ionic current after each spark over time and provides an output signal indicative of said measured value of said ionic current, wherein said output signal is delivered to said output port.

2. The apparatus according to claim 1, wherein said ionic current computing circuit is connected at the midpoint along said secondary winding.

3. An apparatus for determining the state of combustion in an internal combustion engine, said apparatus comprising:

an ignition coil having a primary winding and a secondary winding;

a power supply providing a primary current flow through said primary winding, and an ignition timing control means for interrupting said primary current flow upon receipt of a firing signal from a firing signal input port, connected to said primary winding;

at least one spark plug gap in an engine combustion chamber connected to said secondary winding;

an ionic current sensing, and computing circuit connected to said secondary winding, through a current limiting element, for measuring the flow of ionic current in said combustion chamber when a voltage potential has been applied to said at least one spark plug gap;

a reference voltage input port connected to a reference voltage and an output port, said output port adapted to provide an indication of the state of the combustion and connected to said ionic current computing circuit; and circuit means for producing a voltage potential indicating a spark at said at least one spark plug gap, said circuit means being connected to said ionic current computing circuit; wherein said ionic current computing circuit computes a measured value of said ionic current after each spark over time and provides an output signal indicative of said measured value of said ionic current, said output signal being delivered to said output port, and further comprising a primary flyback voltage comparator circuit for measuring a flyback voltage developed in said primary winding at the instant said primary current is interrupted.

4. An apparatus for determining the state of combustion in an internal combustion engine, said apparatus comprising:

an ignition coil having a primary winding and a secondary winding;

a power supply providing a primary current flow through said primary winding, and an ignition timing control means for interrupting said primary current flow upon receipt of a firing signal from a firing signal input port, connected to said primary winding;

at least one spark plug gap in an engine combustion chamber connected to said secondary winding;

an ionic current sensing, and computing circuit connected to said secondary winding, through a current limiting element, for measuring the flow of ionic current in said combustion chamber when a voltage potential has been applied to said at least one spark plug gap;

a reference voltage input port connected to a reference voltage and an output port, said output port adapted to provide an indication of the state of the combustion and connected to said ionic current computing circuit;

circuit means for producing a voltage potential indicating a spark at said at least one spark plug gap, said circuit means being connected to said ionic current computing circuit; wherein said ionic current computing circuit computes a measured value of said ionic current after each spark over time and provides an output signal indicative of said measured value of said ionic current, said output signal being delivered to said output port, and wherein said ionic current computing circuit is electrically connected at a junction between said ignition timing control means and said primary winding.

* * * * *